US011262291B2

United States Patent
Nielsen (10) Patent No.: US 11,262,291 B2
(45) Date of Patent: Mar. 1, 2022

(54) METHOD OF DETECTING THE LOCALLY GENERATED CORROSION OF A METAL ELEMENT

(71) Applicant: METRICORR APS, Rodovre (DK)

(72) Inventor: Lars Vendelbo Nielsen, Rodovre (DK)

(73) Assignee: METRICORR APS, Rodovre (DK)

( * ) Notice: Subject to any disclaimer, the term of this patent is extended or adjusted under 35 U.S.C. 154(b) by 38 days.

(21) Appl. No.: 16/491,877

(22) PCT Filed: Mar. 6, 2018

(86) PCT No.: PCT/EP2018/055475
§ 371 (c)(1),
(2) Date: Sep. 6, 2019

(87) PCT Pub. No.: WO2018/162483
PCT Pub. Date: Sep. 13, 2018

(65) Prior Publication Data
US 2020/0041403 A1    Feb. 6, 2020

(30) Foreign Application Priority Data

Mar. 8, 2017 (EP) ..................................... 17159834

(51) Int. Cl.
*G01N 17/04* (2006.01)
(52) U.S. Cl.
CPC ..................................... *G01N 17/04* (2013.01)
(58) Field of Classification Search
CPC ............................. G01N 17/04; G01N 17/043
See application file for complete search history.

(56) References Cited

U.S. PATENT DOCUMENTS

| | | |
|---|---|---|
| 6,936,158 B2 | 8/2005 | Nielsen et al. |
| 7,541,817 B2 | 6/2009 | Nielsen et al. |
| (Continued) | | |

FOREIGN PATENT DOCUMENTS

| | | |
|---|---|---|
| EP | 1605247 | 12/2005 |
| EP | 2124034 | 11/2009 |

OTHER PUBLICATIONS

International Search Report on corresponding PCT application (PCT/EP2018/055475) from International Searching Authority (EPO) dated Mar. 27, 2018.

(Continued)

*Primary Examiner* — Noam Reisner
(74) *Attorney, Agent, or Firm* — Klein, O'Neill & Singh, LLP (57) ABSTRACT

A method of detecting a locally generated corrosion of a first metal element when exposing the first metal element (2) to a corrosive environment. A first surface of the first metal element (2) is exposed to the corrosive environment. A sponge (3) is sandwiched between the first metal element (2) and a second metal element (4). The sponge (3) constituting in dry state an electrical insulator and constituting an electrical conductor when wetted in the corrosive environment. An electrical insulator together with the first metal element (2) encapsulates the second metal element (4) and the sponge (3) for preventing the second metal element (4) and the sponge (3) from being directly exposed to the corrosive environment. An impedance between the second metal element (4) and a ground electrode is measured, and a decrease in the impedance from an infinite impedance to a finite impedance caused by a pinhole being generated in the first metal element (2) is monitored.

2 Claims, 10 Drawing Sheets

(56) References Cited

U.S. PATENT DOCUMENTS

| | | | |
|---|---|---|---|
| 2007/0229095 A1 | 10/2007 | Ramgopal et al. | |
| 2013/0009647 A1* | 1/2013 | Miyazawa | G01R 29/12 |
| | | | 324/457 |
| 2016/0041113 A1* | 2/2016 | Pagani | G01N 27/223 |
| | | | 324/694 |

OTHER PUBLICATIONS

Written Opinion on corresponding PCT application (PCT/EP2018/055475) from International Searching Authority (EPO) dated Mar. 27, 2018.

* cited by examiner

METHOD OF DETECTING THE LOCALLY GENERATED CORROSION OF A METAL ELEMENT

CROSS-REFERENCE TO RELATED APPLICATIONS

This application is the national phase entry, under 35 U.S.C. Section 371(c), of International Application No. PCT/EP2018/055475, filed Mar. 6, 2018, claiming priority from European Patent Application No. 17159834.5, filed Mar. 8, 2017. The disclosures of the International Application and the European Application from which this application claims priority are incorporated herein by reference in their entirety.

FEDERALLY SPONSORED RESEARCH OR DEVELOPMENT

Not Applicable

BACKGROUND

The present invention relates to a method of detecting a locally generated corrosion of a metal element when exposing said metal element to a corrosive environment, and to a system for detecting a locally generated corrosion of a metal element when exposing said metal element to a corrosive environment. The present invention also relates to a probe for detecting locally generated corrosion of a metal element when exposing said metal element to a corrosive environment.

Corrosion is a process, which converts a refined metal such as steel to a more chemically-stable form, such as its oxide, hydroxide, or sulfide. It is the gradual destruction of the steel by a chemical and/or an electrochemical reaction with the environment. A corrosive environment typically comprises water and ions, which constitute an electrolyte solution that can carry charges and conduct current. Especially under water or under ground the environment can be seen as an electrolyte solution which conducts electric charges and chemically reacts with metal. In general, the more ions there are in the electrolyte solution the more conductive the electrolyte solution becomes.

As the metal corrodes the resistance of the metal increases. The resistance of an element is a function of its length, width, thickness and the resistivity of the metal that the element is made of. The resistance is inversely proportional to the thickness of the element, which means that the resistance increases as the thickness decreases due to corrosion.

U.S. Pat. No. 6,936,158 describes a system where the corrosion of an object exposed to a corrosive environment is implicitly monitored. A probe with a metal is placed proximate to the object. The resistance of the metal is then measured. U.S. Pat. No. 7,541,817 describes another system for implicitly monitoring the corrosion of an object exposed to a corrosive environment. U.S. Pat. Nos. 6,936,158 and 7,541,817 are incorporated in the present application by reference.

The above examples of systems for implicitly monitoring the corrosion of an object exposed to a corrosive environment are not suitable for monitoring pitting corrosion, or pitting, which is a form of extremely localized corrosion that leads to the creation of small holes in the metal. The driving power for pitting corrosion is the depassivation of a small area, which becomes anodic while an unknown but potentially vast area becomes cathodic, leading to very localized galvanic corrosion. The corrosion penetrates the mass of the metal, with a limited diffusion of ions.

SUMMARY

The above object and advantages together with numerous other objects and advantages, which will be evident from the description of the present invention, are according to a first aspect of the present invention obtained by:

a method of detecting a locally generated corrosion of a metal element when exposing said metal element to a corrosive environment, comprising:
    providing said metal element constituting a first element defining opposite first and second surfaces, said first surface defining an exposed outer surface to be exposed to said corrosive environment, said first element comprising a first pair of terminals,
    providing a first pair of electrical connectors, and contacting each connector of said first pair of electrical connectors with a respective terminal of said first pair of terminals for allowing an injection of an electric current into said first element,
    providing a sponge, said sponge constituting in dry state an electrical insulator and constituting an electrical conductor when wetted in said corrosive environment, and applying said sponge to said second surface of said first element,
    providing a second element of an electrically conductive material, and arranging said second element opposite to said second surface of said first element, and sandwiching said sponge between said first element and said second element,
    providing an electrical insulator, said electrical insulator together with said first element encapsulates said second element and said sponge for preventing said second element and said sponge from being directly exposed to said corrosive environment,
    injecting a specific electric current into said first element via said first pair of electrical connectors, and measuring a voltage between the terminals of said first pair of terminals, and monitoring a gradual increase in said voltage due to a corrosion of said first element, and
    detecting a decrease in said voltage caused by a pinhole being generated in said first element, causing said sponge to be wetted and allowing said second element to provide a shunt relative to said first element thereby reducing a resistance between the terminals of said first pair of terminals.

According to a second aspect of the present invention, the above objects and advantages are obtained by:

a method of detecting a locally generated corrosion of a metal element when exposing said metal element to a corrosive environment, comprising:
    providing said metal element constituting a first element defining opposite first and second surfaces, said first surface defining an exposed outer surface to be exposed to said corrosive environment, said first element comprising a first pair of terminals,
    providing a first pair of electrical connectors, and contacting each connector of said first pair of electrical connectors with a respective terminal of said first pair of terminals for allowing an injection of an electric current into said first element,
    providing a sponge, said sponge constituting in dry state an electrical insulator and constituting an electrical conductor when wetted in said corrosive environment, and applying said sponge to said second surface of said first element, providing a second element of an electrically conductive material, and arranging said second element opposite to said second surface of said first element, and sandwiching said sponge between said first element and said second element, providing an electrical insulator, said electrical insulator together with said first element encapsulates said second element and said sponge for preventing said second element and said sponge from being directly exposed to said corrosive environment, measuring an impedance between said second element and a ground electrode, and monitoring a decrease in said impedance from an infinite impedance to a finite impedance caused by a pinhole being generated in said first element, causing said sponge to be wetted and an electric conducting path being established between said second element and said ground electrode.

The sponge may be made of a laboratory grade filter paper so that the wetting of the sponge does not differ with more than 20% from one sponge in one probe to another sponge in another probe. In this way, the output data from a probe becomes more consistent between probes. When the probe is used underwater, it is desirable to use a sponge rather than air, because the sponge is more robust against high pressure.

The sponge and the second element are on top of each other and constitute a two layer structure. The sponge separates the second element from the first element. The sponge and the second element need to be protected from the environment around the probe at least until a pinhole is in the first element. The first element may be placed on top of the sponge so that the second surface faces the sponge. In this way the second element and the sponge are at one side encapsulated or shielded from the environment. At the remaining sides, a housing may encapsulate or shield the second element and the sponge. The housing may comprise an opening or a window, in which the first element is placed with the first surface facing the surrounding environment/corrosive environment. In this way, the first surface of the first element is directly exposed to the corrosive environment while the second element is indirectly exposed and becomes directly exposed when a pinhole is in the first element. Alternatively, the second element and the sponge may be encapsulated at the remaining sides by an epoxy.

The first pair of terminals is constituted by a first terminal and a second terminal. A terminal may be an area on the first element on which a connector is soldered or connected to the first element. Preferably, the first terminal is at a first end of the first element and the second terminal is at a second end of the first element. The first end and the second end being opposite.

The first pair of electrical connectors is constituted by a first connector and a second connector. The first connector may be connected to the first terminal and the second connector may be connected to the second terminal.

For injecting a current in the first element, the first pair of electrical connectors establishes an electric circuit path in which electrons may move, i.e. the first connector is a connection from a first current generator to the first terminal, and the second connector is a return path from the second terminal to the first current generator. To provide a stable current through the first element a first resistor with a high resistor value such as 10 kΩ or more may be connected in series with the first element. The current may be an alternating current (AC current) of a frequency between 0.5 kHz and 10 kHz.

The voltage across the first element may be measured by a first analyzing unit, wherein a voltmeter function is implemented. A first pair of wires constituted by a first wire and a second wire may connect the first terminal and the second terminal respectively with the first analyzing unit.

A specific electric current means a current of a specific value such as 10 mA or less, which does not change with the voltage across the first element (the voltage drop or simply voltage between the first terminal and the second terminal). This makes the current a known parameter and with a measured value of the voltage across the first element, the resistance of the first element can be determined from Ohm's law.

The resistance of the first element depends primarily on the material it is made of and its shape. The thickness of the first element may be derived from the resistance derived from the current and the voltage. As the voltage is monitored as a function of time, the thickness can be monitored as a function of time. The resistance or the thickness of the first element may be compared to a first threshold value, i.e. if the thickness is 50% less than the initial thickness an alarm may be set or if the resistance is 50% greater than the initial resistance an alarm may be set.

The corrosion of the first element may result in a pinhole in the first element, i.e. a through hole in the first element. If that happens, the encapsulation of the sponge and the second element is no longer complete and an electrolyte solution in the corrosive environment may flow through the pinhole and wet the sponge making the sponge and second element a shunt with respect to the first element. This effectively decreases the resistance between the first terminal and the second terminal, which means that the voltage across the first element decreases, since the current is held constant. The first analyzing unit may compare the voltage with a threshold value, i.e. if the voltage has decreased with 50% an alarm is set, the comparison may be conditioned upon a time window, i.e. a flag is set if the voltage has decreased with 20% within a period of 10 or 5 minutes.

The second element may comprise a back terminal, wherein a second element wire is provided and the back terminal is contacted by the second element wire for measuring the impedance between the second element and the ground electrode. The second element wire may connect the back terminal with the second analyzing unit wherein an impedance measuring function is implemented. The first analyzing unit and the second analyzing unit may be an integral unit.

The impedance may be a result of an induced current in the electrolyte solution in the ground or water due to a nearby powerline. Thus, an AC current will flow in the electrolyte solution between the ground electrode and the second element. The second analyzing unit may determine the magnitude of the impedance and the phase difference between the induced AC current and voltage. Alternatively, a second current generator or a voltage source may be used to induce an AC current in the electrolyte solution such that a current may flow between the ground electrode and the second element.

The ground electrode may be connected to a ground, which may serve reasonably as a constant potential reference against which other potentials can be measured. In electronic circuit theory, a ground is usually idealized as an infinite source or sink for charge, which can absorb an unlimited amount of current without changing its potential/voltage.

Preferably, the ground electrode is an earth electrode placed into the earth proximate to the first element, which means that the ground electrode is not more than 10 m from the first element. If the first element is placed in water, the ground electrode may be inserted down into the seabed.

A third element of a metal for defining a temperature reference with respect to the first element may be provided. The third element being encapsulated for preventing exposure to said corrosive environment.

The third element may comprise a second pair of terminals, wherein a second pair of electrical connectors is provided and each connector of the second pair of electrical connectors is contacted with a respective terminal of the second pair of terminals for allowing an injection of an electric current into the third element.

A specific electric current may be injected into the third element via the second pair of electrical connectors, and a voltage between the terminals of the second pair of terminals may be measured The voltage between the terminals of the first pair of terminals may be compared with the voltage between the terminals of the second pair of terminals for determining a voltage bias of the first element.

The first element may be provided with a first shape constituted by a first length, a first width, and a first thickness, and the second element may be provided with a second shape constituted by a second length, a second width, and a second thickness, wherein a difference between the first shape and the second shape is less than 20%.

The first thickness may be determined as a function of the specific electric current and the voltage between the terminals of the first pair of terminals.

According to a third aspect of the present invention, the above objects and advantages are obtained by:

a system for detecting a locally generated corrosion of a metal element when exposing said metal element to a corrosive environment, said system comprising said metal element,
  wherein said metal element constituting a first element defining opposite first and second surfaces, said first surface defining an exposed outer surface to be exposed to a corrosive environment, said first element comprising a first pair of terminals,
  said system further comprising a first pair of electrical connectors, wherein each connector of said first pair of electrical connectors is connected to a respective terminal of said first pair of terminals for allowing an injection of an electric current into said first element,
  a sponge, said sponge constituting in dry state an electrical insulator and constituting an electrical conductor when wetted in said corrosive environment,
  wherein said sponge is juxtaposed said second surface of said first element,
  a second element of an electrically conductive material,
  wherein said second element is opposite to said second surface of said first element and wherein said sponge is sandwiched between said first element and said second element,
  an electrical insulator, said electrical insulator together with said first element encapsulates said second element and said sponge for preventing said second element and said sponge from being directly exposed to said corrosive environment,
  a current generator for injecting a specific electric current into said first element via said first pair of electrical connectors,
  a voltmeter for measuring a voltage between the terminals of said first pair of terminals, and monitoring the gradual increase in said voltage due to the corrosion of said first element, and
  a first analysing unit for detecting the decrease in said voltage caused by a pinhole being generated in said first element, causing said sponge to be wetted and allowing said second element to provide a shunt relative to said first element thereby reducing the resistance between the terminals of said first pair of terminals.

According to a fourth aspect of the present invention, the above objects and advantages are obtained by:

a system for detecting a locally generated corrosion of a metal element when exposing said metal element to a corrosive environment, said system comprising said metal element,
  wherein said metal element constituting a first element defining opposite first and second surfaces, said first surface defining an exposed outer surface to be exposed to a corrosive environment, said first element comprising a first pair of terminals,
  said system further comprising a first pair of electrical connectors, wherein each connector of said first pair of electrical connectors is connected to a respective terminal of
  said first pair of terminals for allowing an injection of an electric current into said first element, a sponge, said sponge constituting in dry state an electrical insulator and constituting an electrical conductor when wetted in said corrosive environment,
  wherein said sponge is juxtaposed said second surface of said first element,
  a second element of an electrically conductive material,
  wherein said second element is opposite to said second surface of said first element and wherein said sponge is sandwiched between said first element and said second element,
  an electrical insulator, said electrical insulator together with said first element encapsulates said second element and said sponge for preventing said second element and said sponge from being directly exposed to said corrosive environment,
  a current generator for injecting a specific electric current into said first element via said first pair of electrical connectors,
  a voltmeter for measuring a voltage between the terminals of said first pair of terminals, and monitoring a gradual increase in said voltage due to the corrosion of said first element, and
  a measuring unit for measuring an impedance between said second element and a ground electrode and
  a first analyzing unit for monitoring a decrease in said impedance from an infinite impedance to a finite impedance caused by a pinhole being generated in said first element, causing said sponge to be wetted and an electric conducting path being established between said second element and said ground electrode.

According to a fifth aspect of the present invention, the above objects and advantages are obtained by:

a probe for detecting a locally generated corrosion of a metal element when exposing said metal element to a corrosive environment, said probe comprising said metal element, wherein said metal element constituting a first element defining opposite first and second surfaces, said first surface defining an exposed outer surface to be exposed to a corrosive environment, said first element comprising a first pair of terminals for connecting to a first pair of electrical connectors, a sponge, said sponge constituting in dry state an electrical insulator and constituting an electrical conductor when wetted in said corrosive environment, wherein said sponge is juxtaposed said second surface of said first element, a second element of an electrically conductive material, wherein said second element is opposite to said second surface of said first element and wherein said sponge is sandwiched between said first element and said second element, an electrical insulator, said electrical insulator together with said first element encapsulating said second element and said sponge for preventing said second element and said sponge from being directly exposed to said corrosive environment.

The probe may be used to derive an indication of a state of corrosion of an object such as a pipeline or a supporting structure underground or under water. Such objects are typically exposed to a corrosive environment because of the presence of water and ions, which constitute an electrolyte solution that can carry charges and conduct current.

The probe is preferably placed in proximity to the object of interest and the first element is preferably made of the same material as the object, typically steel. If information about the material properties of the object is not available, the first element may be made of a corrosive metal such as steel.

According to a fifth aspect of the present invention, the above objects and advantages are obtained by a probe according to the fourth aspect of the present invention used for deriving an indication of a corrosion of a pipeline or an underwater structure such as an oil platform leg.

BRIEF DESCRIPTION OF THE DRAWINGS

The aspects of the invention will be explained in more detail below in connection with advantageous embodiments of the invention with reference to the drawings, in which:

FIG. 1a illustrates an application and use of a probe for detecting a locally generated corrosion of a metal element FIG. 1b is an enlarged view of the type of probe installed in the four sections I to IV of FIG. 1a.

FIG. 2b is an exploded view of the probe shown in FIG. 2a.

FIG. 3a illustrates the B-B' cross section in FIG. 2a.

FIG. 4b is an exploded view of the probe shown in FIG. 4a.

DETAILED DESCRIPTION

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout. Like elements will thus, not be described in detail with respect to the description of each figure.

Figures 1A, 1B:
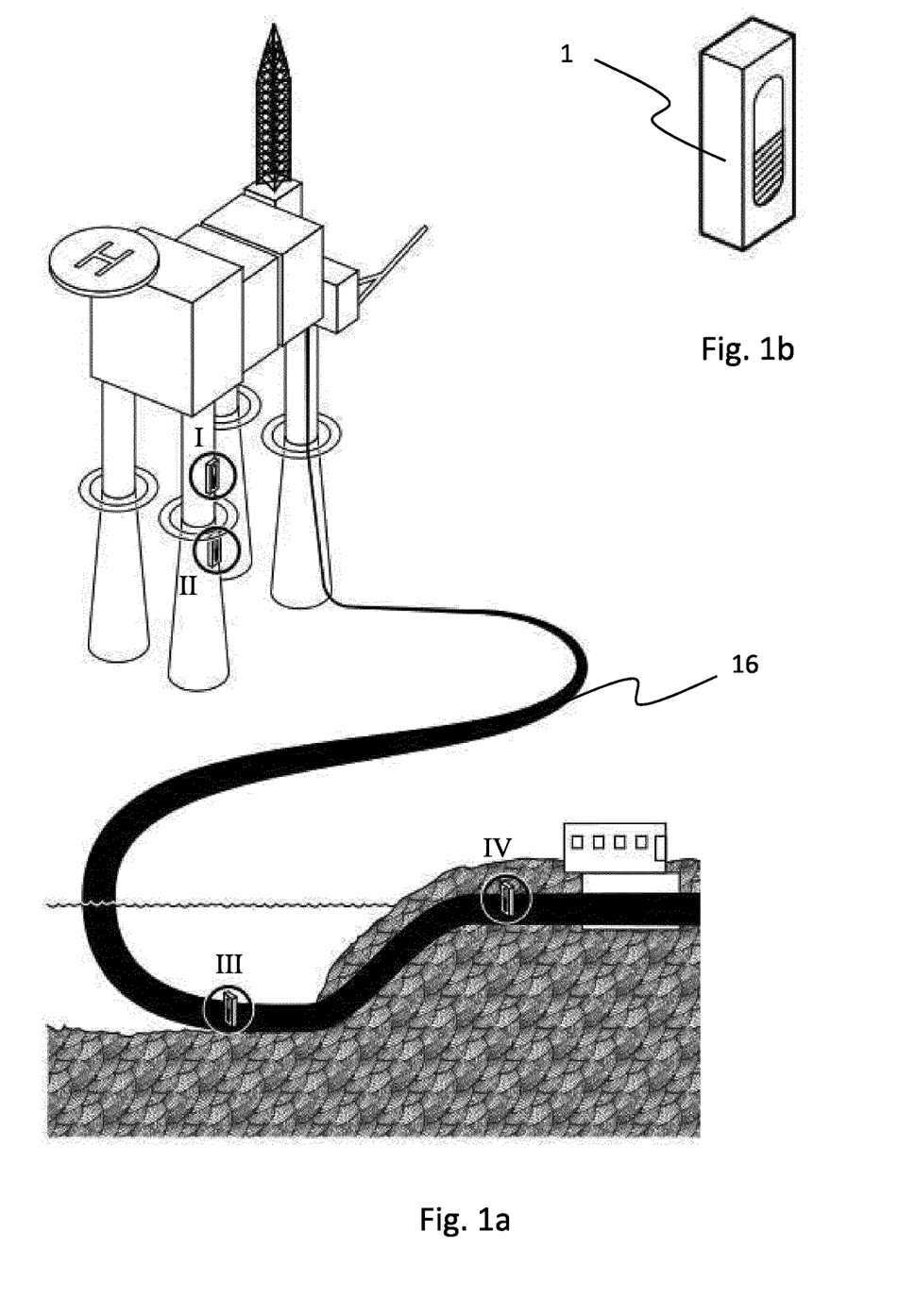

FIG. 1a illustrates an application and use of a probe for detecting a locally generated corrosion of a metal element when exposing said metal element to a corrosive environment. A pipeline 16 leads a hydrocarbon fluid from an oil and gas well. A number of probes 1 are placed in proximity to structural elements of the system, which are exposed to a corrosive environment. The probe 1 comprises a housing 6 for housing a metal element constituting a first element 2. The first element 2 is made of the same material as the structural element, which the probe is proximate to. Alternatively, the first element is made of steel. In this way, a corrosion of the first element is an indication of a corrosion of the structural element. The probes are placed in proximity to an underground pipeline, an underwater pipeline, an underwater structural building element and an over-water structural building element.

FIG. 1b is an enlarged view of the type of probe installed in the four sections I to IV of FIG. 1a.

Figure 2A:
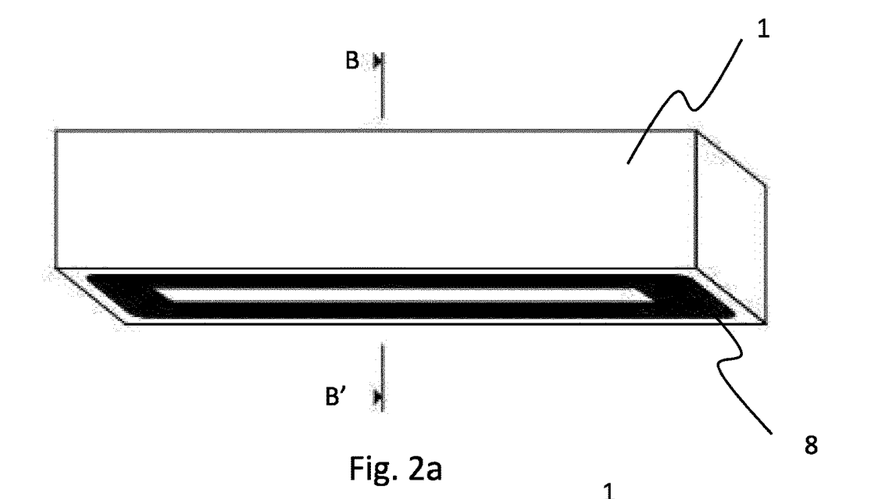
FIG. 2a is a view of a probe for detecting a locally generated corrosion of a metal element.
Figure 2B:
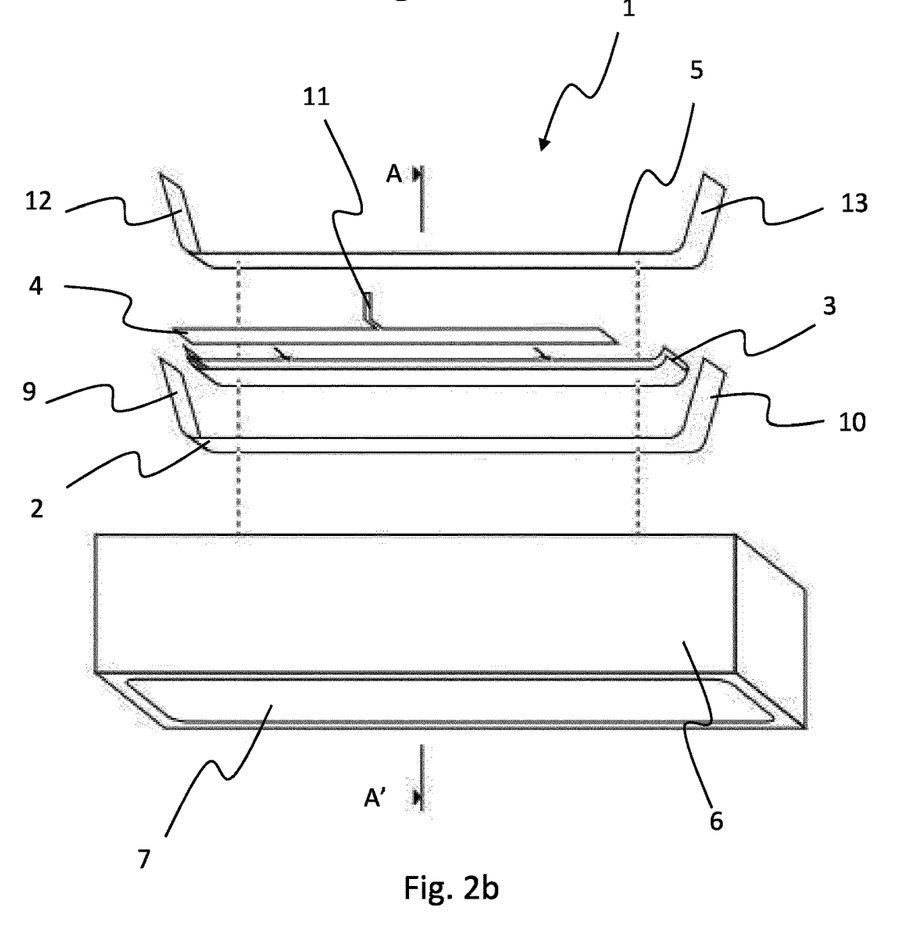

FIG. 2a is a view of a probe 1 for detecting a locally generated corrosion of a metal element when exposing said metal element to a corrosive environment, and FIG. 2b is an exploded view of the probe. The metal element constitutes a first element 2. The first element is made of a first strip of steel with a width of approximately 0.5 cm, a thickness of approximately 2 mm and a length of approximately 10 cm.

The first element has a first bend and a second bend for providing a first pair of terminals constituted by a first terminal 9 and a second terminal 10. Each of the first and second bends has an angle of 70°, and is approximately 1 cm from each end of the first element. The pair of terminals is thus defined by a first terminal at a first end of the first element and a second terminal at a second end of the first element.

A first pair of electric connectors can be soldered to a respective terminal of the first pair of terminals such that a first electric connector is soldered to the first terminal and a second electric connector is soldered to the second terminal.

The first element has a first surface 14 constituting an outer surface facing in a first direction, and a second surface 15 constituting an inner surface facing in a second direction, which is opposite to the first direction so that the first and second surfaces are opposite.

The probe has a housing 6. The housing is rectangular with a width of approximately 2 cm, a height of approximately 3 cm and a length of approximately 15 cm. The housing has an opening 7.

The probe also has a second element 4. The second element is made of a steel foil with a width of approximately 0.3 cm so that it is less wide than the width of the first element, a thickness of approximately 0.1 mm and a length of approximately 8 cm so that it is not longer than the distance between the bends of the first element. The steel foil is cut so that a foil terminal protrudes from the rest of steel foil at approximately the centre of the steel foil. The foil terminal constitutes a back terminal 11.

The back terminal 11 is bent at an angle of approximately 90° so that it faces away from the opening 7 towards the interior of the housing 6. A second element wire can be soldered to the back terminal 11. The second element wire establishing a connection to a first analyzing unit 18.

The second element 4 is accommodated in a sponge 3 made of a laboratory grade filter paper with a pore size of 6 µm and a thickness of 0.2 mm. The sponge 3 has a length corresponding to the length of the second element, a width approximately twice the width of the second element. The sponge is folded along the length for sandwiching the second element 4 between a top layer 3a f the sponge and a bottom layer 3b of the sponge 3.

The top layer 3a of the sponge is adjacent the second surface 15 of the first element 2 so that the top layer 3a of the sponge 3 is sandwiched between the first element 2 and the second element 4.

The probe 1 has a third element 5 made of a second strip of steel with a width of approximately 0.5 cm, a thickness of approximately 2 mm and a length of approximately 10 cm, so that the difference between the dimensions of the first element 2 and the third element 5 is less than 20%, when the first element has not yet been exposed to a corroding environment.

The third element 5 has a third bend and a fourth bend for providing a second pair of terminals constituted by a third terminal 12 and a fourth terminal 13. Each of the third and fourth bends has an angle of 80° so that the angles are greater than the angles of the bends on the first element. The third and fourth bends are approximately 1 cm from each end of the third element.

A second pair of electric connectors can be soldered to a respective terminal of the second pair of terminals such that a third electric connector is soldered to the third terminal 12 and a fourth electric connector is soldered to the fourth terminal 13.

The third element 5 is adjacent the bottom layer 3b of the sponge 3 so that the bottom layer of the sponge is sandwiched between the second element 4 and the third element 5. The second pair of terminals extends in a direction away from the opening 7 towards the interior of the housing 6.

Figure 3A:
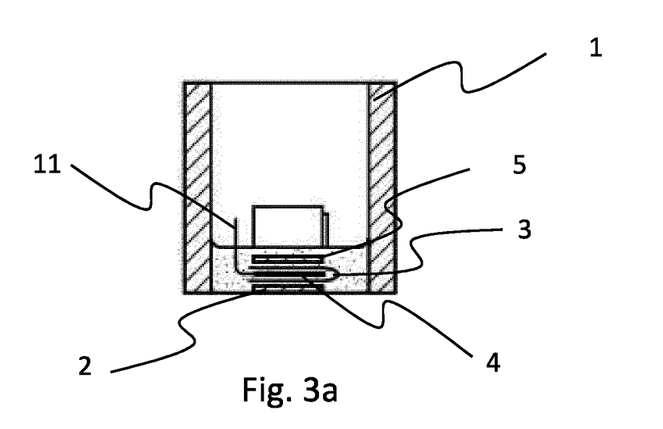
Figure 3B:
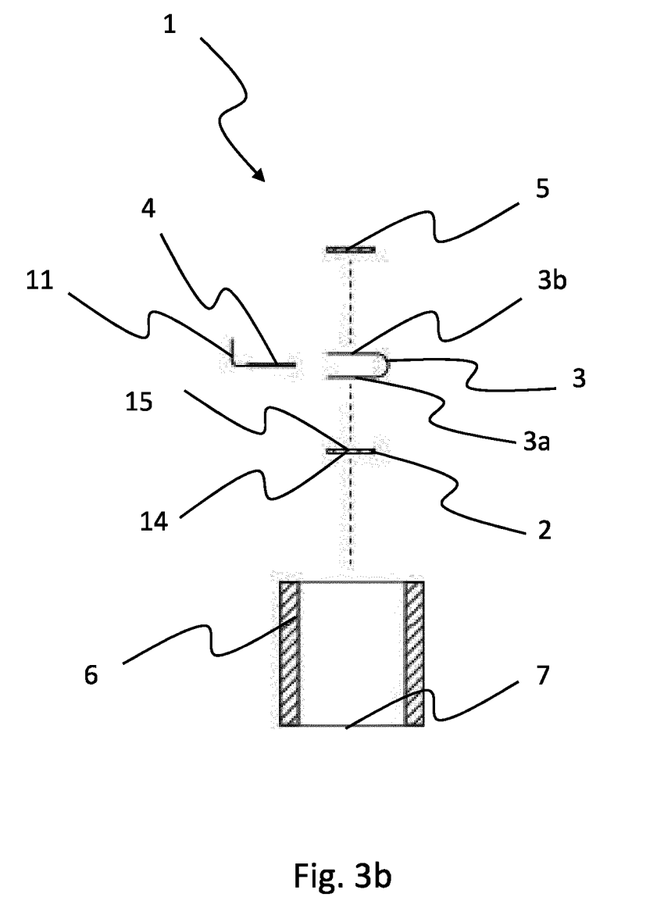
FIG. 3b illustrates the A-A' cross section in FIG. 2b.

FIG. 3a illustrates the B-B' cross section in FIG. 2a and FIG. 3b illustrates the A-A' cross section in FIG. 2b. The sponge 3 accommodates the second element 4 and surrounds the second element 4 on three sides. The probe 1 is a layered structure comprising the first element 2, the top layer 3a of the sponge, the second element 4, the bottom layer 3b of the sponge and the third element 5.

The first element 2 is in an opening 7 in a housing 6 so that the first surface 14 is exposed to an environment surrounding the housing. The first pair of terminals extends in a direction away from the opening towards the interior of the housing.

An electrical insulator 8 in the form of an epoxy is between the first element 2 and the housing 6, i.e. between the perimeter of the first element and the perimeter of the housing so that the opening is closed by the first element and the epoxy. The epoxy is an electric insulator and does not corrode as fast as the first element.

The epoxy surrounds the layered structure inside the housing so that only the first surface 14 is exposed to the environment surrounding the housing and so that the layered structure is fixed to the housing. The first pair of terminals, second pair of terminals and back terminal extend out from the epoxy.

Figure 4A:
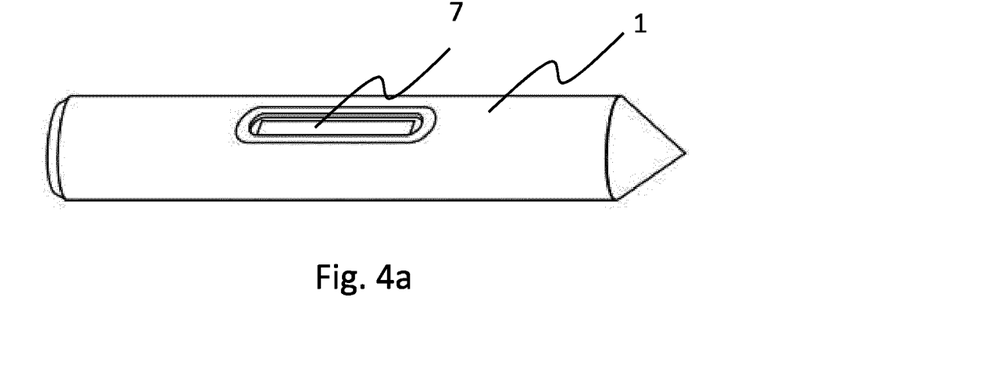
FIG. 4a is a view of a probe for detecting a locally generated corrosion of a metal element.
Figure 4B:
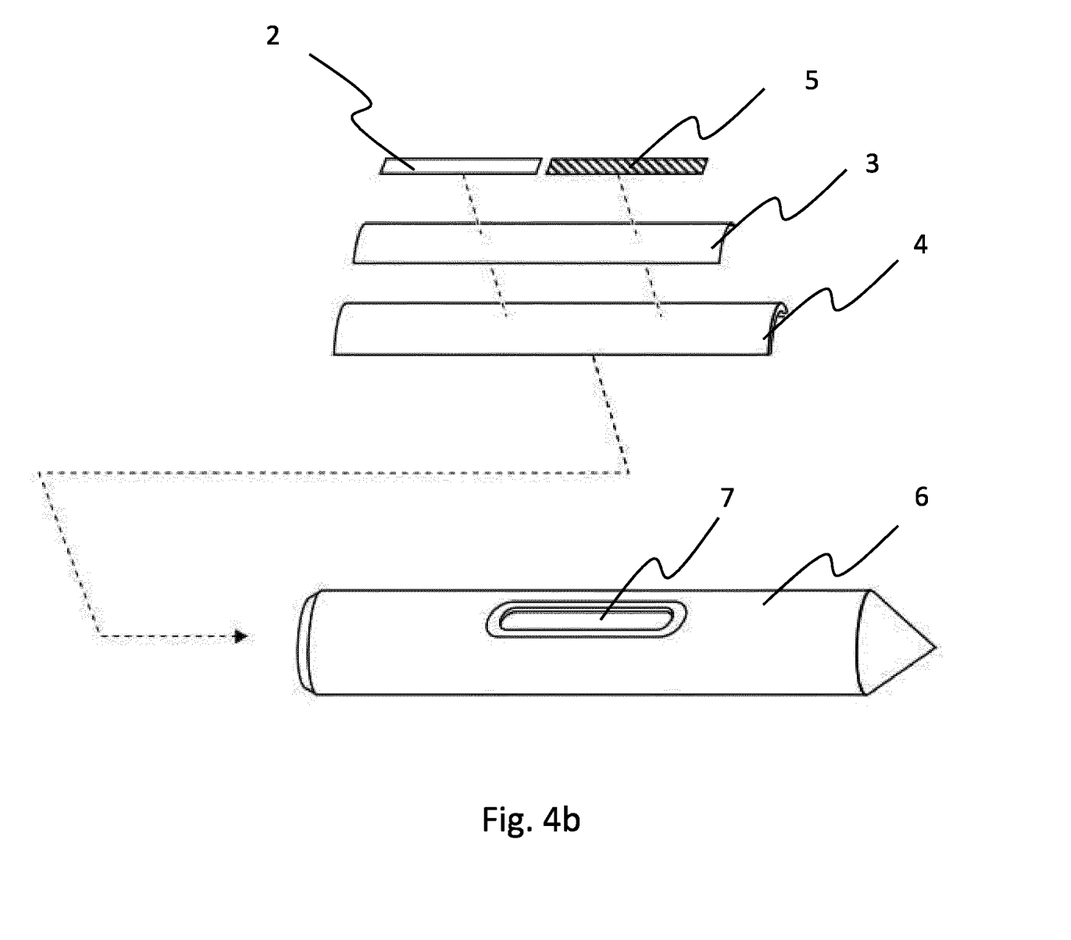

FIG. 4a is a view of a probe for detecting a locally generated corrosion of a metal element when exposing said metal element to a corrosive environment, and FIG. 4b is an exploded view of the probe.

The metal element constitutes a first element 2. The first element 2 is made of a first strip of steel with a width of approximately 0.5 cm, a thickness of approximately 2 mm and a length of approximately 8 cm.

The first element 2 has a first surface 14 constituting an outer surface facing in a first direction, and a second surface 15 constituting an inner surface facing in a second direction, which is opposite to the first direction so that the first and second surfaces are opposite.

The first element 2 has a first end and a second end, which constitute a first pair of terminals. A first pair of electric connectors can be soldered to a respective terminal of a first pair of terminals such that a first electric connector is soldered to a first terminal and a second electric connector is soldered to a second terminal.

The probe has a housing 6. The housing is cylindrical with a diameter of approximately 4 cm, and a length of approximately 20 cm. The housing has a conical shape at a first end and a lid at a second end. The housing has an opening 7. The opening is rectangular with a length of approximately 7 cm and a width of approximately 0.4 cm so that the opening is smaller than the first element 2.

The probe has a second element 4. The second element is made of steel and has the shape of a half cylinder. The second element has a length of approximately 18 cm, a width of approximately 3 cm and a height of approximately 1.5 cm so that it fits inside the housing.

A sponge 3 made of a laboratory grade filter paper is on the second element. The sponge extends on the convex surface of the second element until 0.5 cm from the edges of the second element.

The probe has a third element 5 made of a second strip of steel with a width of approximately 0.5 cm, a thickness of approximately 2 mm and a length of approximately 8 cm so that the difference between the dimensions of the first element and the third element is less than 20% when the first element has not yet been exposed to a corroding environment.

The third element 5 has a third end and a fourth end, which constitute a second pair of terminals. A second pair of electric connectors can be soldered to a respective terminal of the second pair of terminals such that a third electric connector is soldered to a third terminal and a fourth electric connector is soldered to a fourth terminal.

A second element wire can be soldered to the second element for establishing a connection to a first analyzing unit 18.

The first element 2 is on the sponge 3 and extends in the longitudinal direction of the sponge. The first element is followed by the third element 5 with the second end of the first element being adjacent to the third end of the third element.

The first element 2 is in the opening 7 of the housing 6 so that the first surface is exposed to an environment surrounding the housing.

The housing seals the inside from the outside of the housing. The housing is an electric insulator which together with the first element encapsulates the second element and the sponge for preventing the second element and the sponge from being directly exposed to the outside environment.

Figure 5:
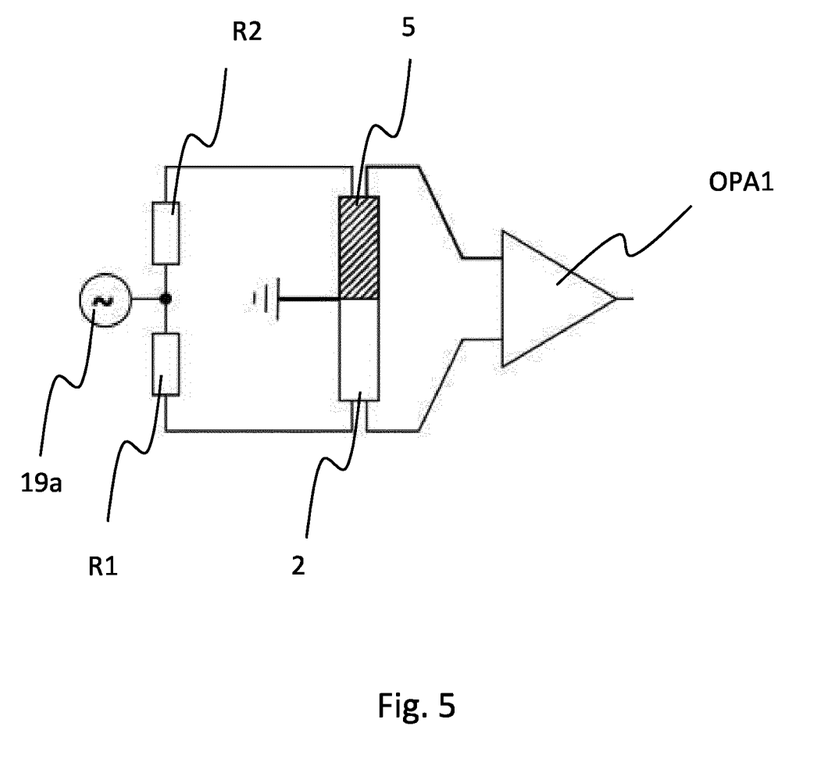
FIG. 5 shows a bridge circuit.

FIG. 5 shows the first element 2 and the third element 5 in a bridge circuit. The circuit comprises a first current generator 19a for supplying a first AC current at a frequency of approximately 1 kHz. The first AC current is split into two equal excitation currents in the first pair of electrical connectors and the second pair of electrical connectors (in FIG. 5 the return path is illustrated as a ground connection, i.e. the first connector is connected to the first terminal of the first element via a first resistor R1 and current returns via the second connector connected to the second terminal. The third connector is connected to the third terminal of the third element via a second resistor R2 and current returns via the fourth connector connected to the fourth terminal.)

The first and second resistors R1 and R2 provide electrical resistance, which differ by less than 10%. The resistance of the first resistor is 10 kΩ and the resistance of the second resistor is 10 kΩ so that the resistances of the first and second resistors R1 and R2 are much larger than the resistance of the first element and the resistance of the third element. This means that the excitation current will be substantially evenly distributed through the first and second resistors R1 and R2, even if the resistance of the first element and the resistance of the third element is changing.

The excitation current induces a first voltage across the first element and a second voltage across the third element. A subtraction of the first and second voltage constitutes a voltage difference. A differential amplifier OPA1 is connected to the first terminal and the fourth terminal and amplifies the differential voltage.

Figure 6:
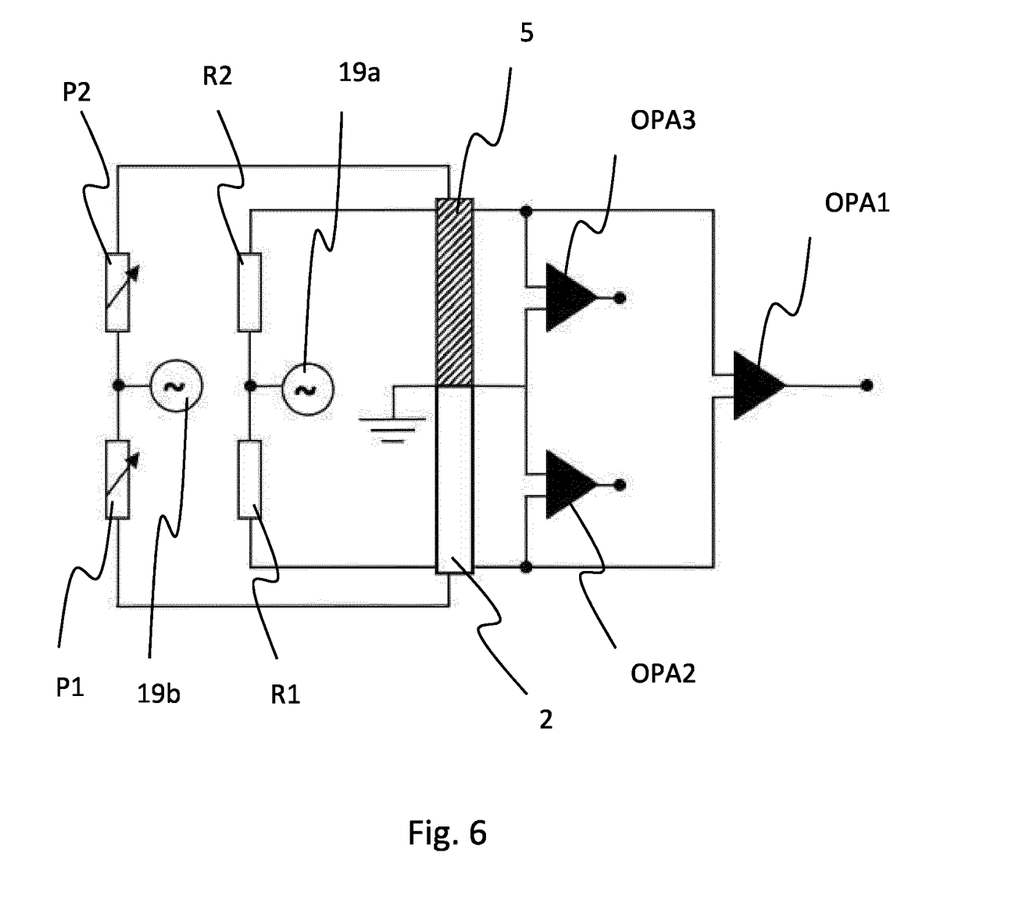
FIG. 6 shows a bridge circuit.

FIG. 6 shows the first element 2 and the third element 5 in a bridge circuit, which in addition to the bridge circuit in FIG. 5 has a second amplifier OPA2 and a third amplifier OPA3 for amplifying the voltage across the first element 2 and the third element 5 respectively. Furthermore, the bridge circuit in FIG. 6 has a second current generator 19b for supplying a second AC current at a frequency of approximately 2 kHz, so that the frequency of first AC current and the frequency of the second AC current are different.

The second AC current is split into two excitation currents in a fifth connector and a sixth connector. The fifth connector is connected to the first terminal of the first element via a first potentiometer P1. The sixth connector is connected to the fourth terminal of the third element via a second potentiometer P2. The first potentiometer and the second potentiometers both having a range of 100Ω to 10 kΩ.

If the difference in resistance between the first element and the second element before the first element has been exposed to a corroding environment is different from zero (initial resistance difference), the value of the first potentiometer and/or the second potentiometer may be adjusted until the initial resistance difference is zero.

Figure 7A:
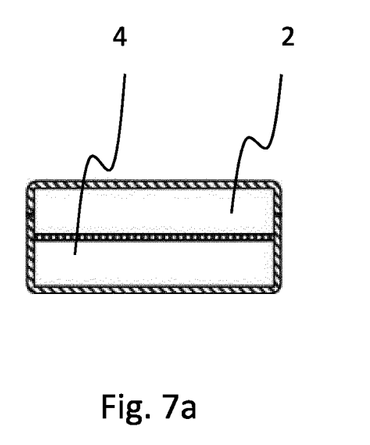
FIGS. 7a-7d illustrates a side view and a top view of part of a probe before and after local corrosion.
Figure 7B:
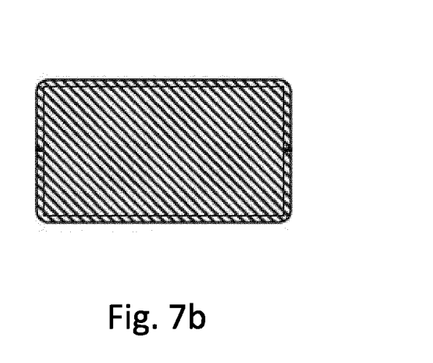

FIG. 7a illustrates the first element 2 and the second element 4 seen from the side before the first element has been exposed to a corroding environment, and FIG. 7b illustrates the first element and the second element seen from above in a direction towards the first surface defining an exposed outer surface to be exposed to a corrosive environment.

Figure 7C:
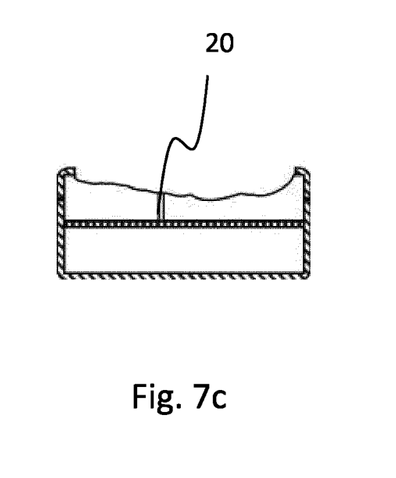

FIG. 7c illustrates the first element and the second element seen from the side after the first element has been exposed to a corroding environment. Corrosion is a process, which converts a refined metal such as steel to a more chemically-stable form, such as its oxide, hydroxide, or sulfide. It is the gradual destruction of the steel by a chemical and/or an electrochemical reaction with the environment. Especially under water or under ground, the environment can be seen as an electrolyte solution, which conducts electric charges and chemically reacts with the first element. In general, the more ions there are in the electrolyte solution, the more conductive the electrolyte solution becomes. The corrosion may be uniform across the first surface of the first element and/or it may only be a pinhole 20 as described further in the next paragraph regarding FIG. 7c.

The resistance as a function of time of the first element $R_c$ is a function of its length L, width w, thickness d, and the resistivity ρ of the steel that the first element is made of:

$$R_C(t) = \rho \frac{L}{w} \frac{1}{d(t)}$$

The resistance is inversely proportional to the thickness of the first element, which means that the resistance increases as the thickness decreases. A uniform corrosion of the first surface of the first element means that the thickness decreases as a function of the time period the first element is exposed to the corroding environment. Assuming a uniform corrosion, other things aside the thickness may be determined from:

$$d(t) = \rho \frac{L}{w} \frac{1}{R_C(t)}$$

Using that $$R_C(t=0) = \frac{\rho L}{w \cdot d_0}$$

the above can be written as:

$$d(t) = d_0 \frac{R_C(t=0)}{R_C(t)}$$

The resistivity depends on temperature T and a model for the temperature dependence may be:

$$\rho(T) = \rho_0 (1+\alpha)^{T-T_0}$$

where $\rho_0$ is the resistivity at a reference temperature $T_0$, and α is the temperature coefficient of resistivity. The third element can be used to take account for the temperature dependence so that the thickness may be determined from:

$$d(t) = d_0 \frac{R_C(t=0)}{R_C(t)} \frac{R_R(t)}{R_R(t=0)}$$

where the resistance $R_R$ of the third element has been used as an index factor, i.e. if the resistance of the third element at time t is twice the resistance of the third element at time 0 a multiplication of 2 happens.

In FIG. 7c, the first element has been exposed to a corroding environment in a time period (from initial exposure to a penetration time $t_p$) so that the first element has started to corrode and a local corrosion has created a pinhole 20 down to the second element exposing the second element to the corrosive environment. This is also called pitting corrosion, or pitting, which is a form of extremely localized corrosion that leads to the creation of small holes in the metal. The driving power for pitting corrosion is the depassivation of a small area, which becomes anodic while an unknown but potentially vast area becomes cathodic, leading to very localized galvanic corrosion. The corrosion penetrates the mass of the metal, with a limited diffusion of ions. A pitting factor PF is the ratio between the thickness of the first element at the time of penetration and the thickness of the first element before the first element has been exposed to a corroding environment:

$$PF = \frac{d(t_p)}{d_0}$$

which is a factor between 0 and 1, where 0 means the first element has been completely corroded and 1 means that only a pinhole has been corroded.

Figure 7D:
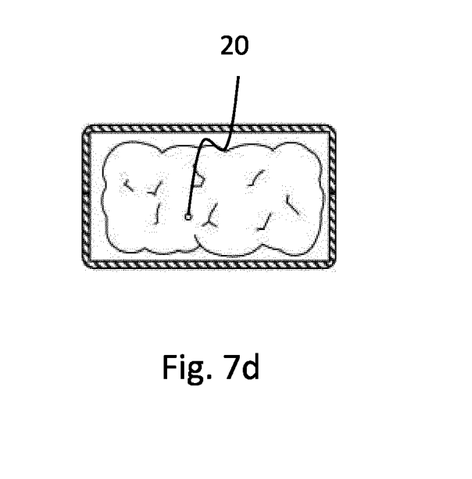

FIG. 7d illustrates a top view of the first element and the second element shown in FIG. 7c. In FIG. 7d, the first element and the second element are seen from above in a direction towards the first surface after the first element has been exposed to a corroding environment.

Figure 8A:
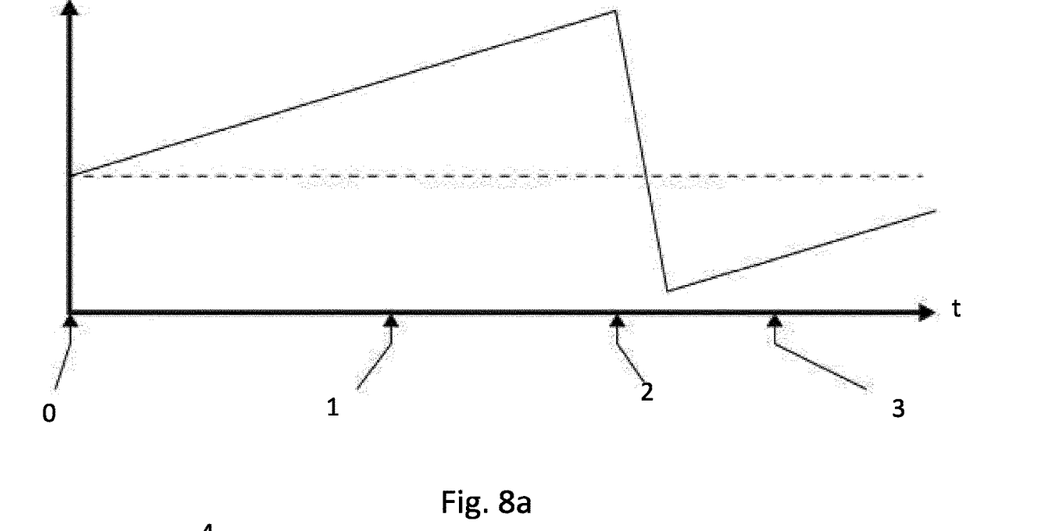
FIG. 8a is a measurement of voltage as a function of time.

FIG. 8a is a measurement of the voltage V between the first terminal 9 and the second terminal 10 of the first element 2 shown in FIG. 2a as a function of time t. Four different stages of corrosion of the first element is illustrated in FIGS. 8b-8e corresponding to the first element 2 and second element 4 seen at times 0, 1, 2, 3 in FIG. 8a.

Figure 8B:
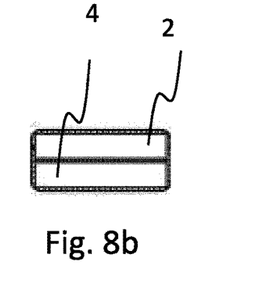
FIGS. 8b-8e illustrates corrosion of part of a probe as a function of time.

As a new probe is placed in a corrosive environment at time 0, no corrosion of the first element has taken place and the second element is not yet directly exposed to the corrosive environment.

Figure 8C:
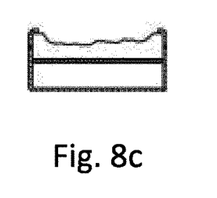

As time passes, the first element experiences a corrosion, which is illustrated by the thickness of the first element at time 1 is less than at time 0. This results in an increased resistance of the first element. The increased resistance results in an increased voltage over the first element (between the first terminal and the second terminal).

Figure 8D:
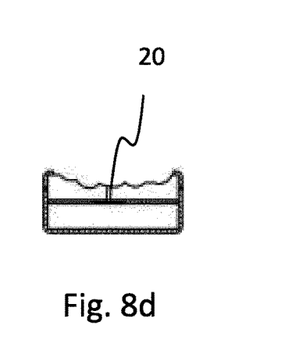

At time 2 (penetration time), a local corrosion of the first element has created a pinhole 20 in the first element so that the second element has become directly exposed to the environment. This means that an electrolyte solution can begin to flow in through the pinhole and saturate the sponge with fluid (electrolyte solution). Current in the first element can be led through the wetted sponge, through the second element and back through the wetted sponge into the first element. Effectively, the wetted sponge and the second element establish a shunt, in which current is allowed to pass through. The resistance between the first terminal and the second terminal suddenly becomes lower, which results in a decreased voltage between the first terminal and the second terminal.

Figure 8E:
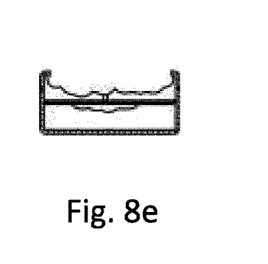

Since the second element has become exposed to the environment at time 2, it starts to corrode, which is illustrated at time 3 by a part of the second element being corroded. As this happens, the shunt becomes less effective and the voltage starts to go up again.

Figure 9:
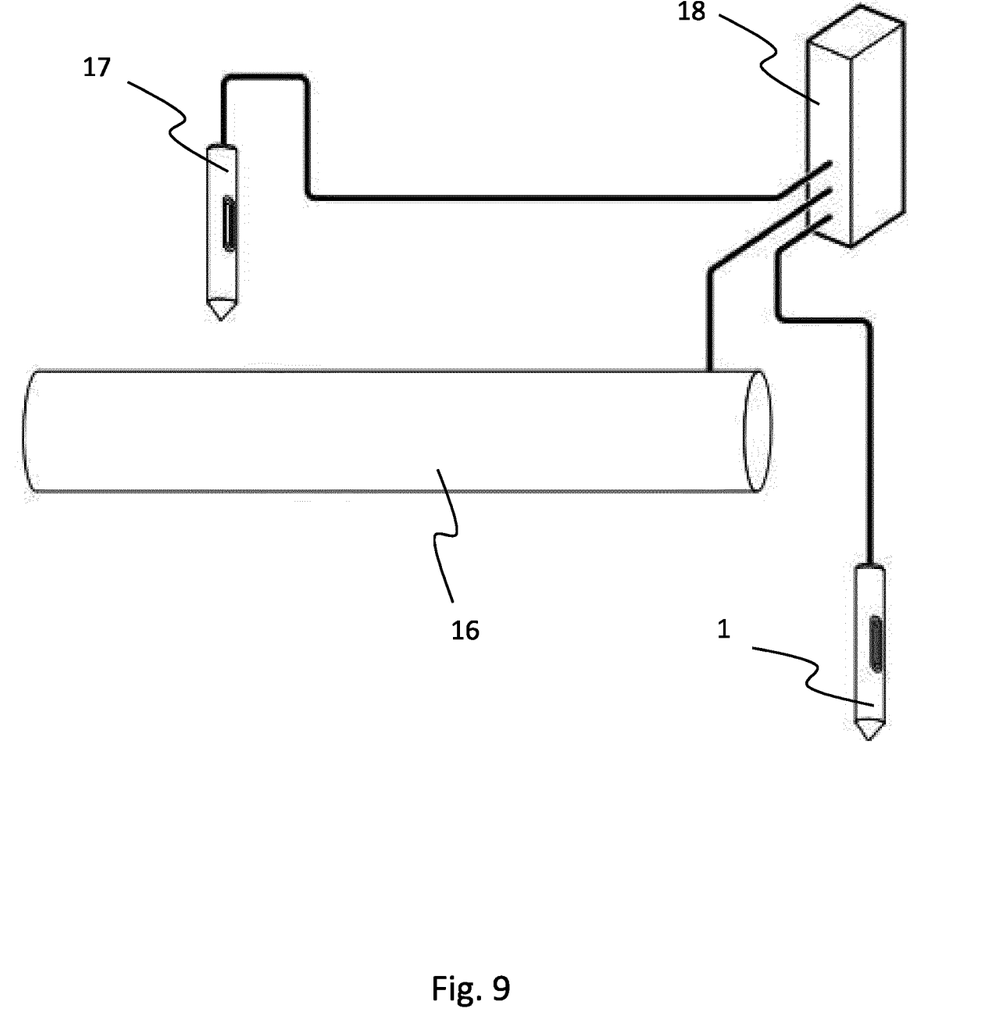
FIG. 9 is a view of a system for detecting a locally generated corrosion of a metal element.

FIG. 9 is a view of a system for detecting a locally generated corrosion of a metal element when exposing said metal element to a corrosive environment. The metal element 2 is in the probe shown in FIG. 6, which is proximate to a pipeline 16. A first cable comprises a number of wires for connecting the probe 1 with a first analyzing unit 18. A second cable connects a ground electrode 17 with the first analyzing unit. A third cable connects the pipeline 16 with the first analyzing unit 18. The first analyzing unit comprises an AC voltmeter for measuring voltage and current between terminals. The magnitude of the impedance between terminals is the ratio between voltage and current and the phase of the impedance is the phase between the voltage and the current. The first analyzing unit can measure the impedance between the ground electrode and the pipeline, the first element and the second element respectively. The first analyzing unit can also measure the impedance between the pipeline and the first element and the second element respectively.

The first analyzing unit comprises a power source for providing an AC current between the second element and the ground electrode. The AC current has a frequency of approximately 1 kHz so that noise from example power lines in the vicinity of the pipeline influences the measurement as little as possible.

Figures 10A, 10B, 10C:
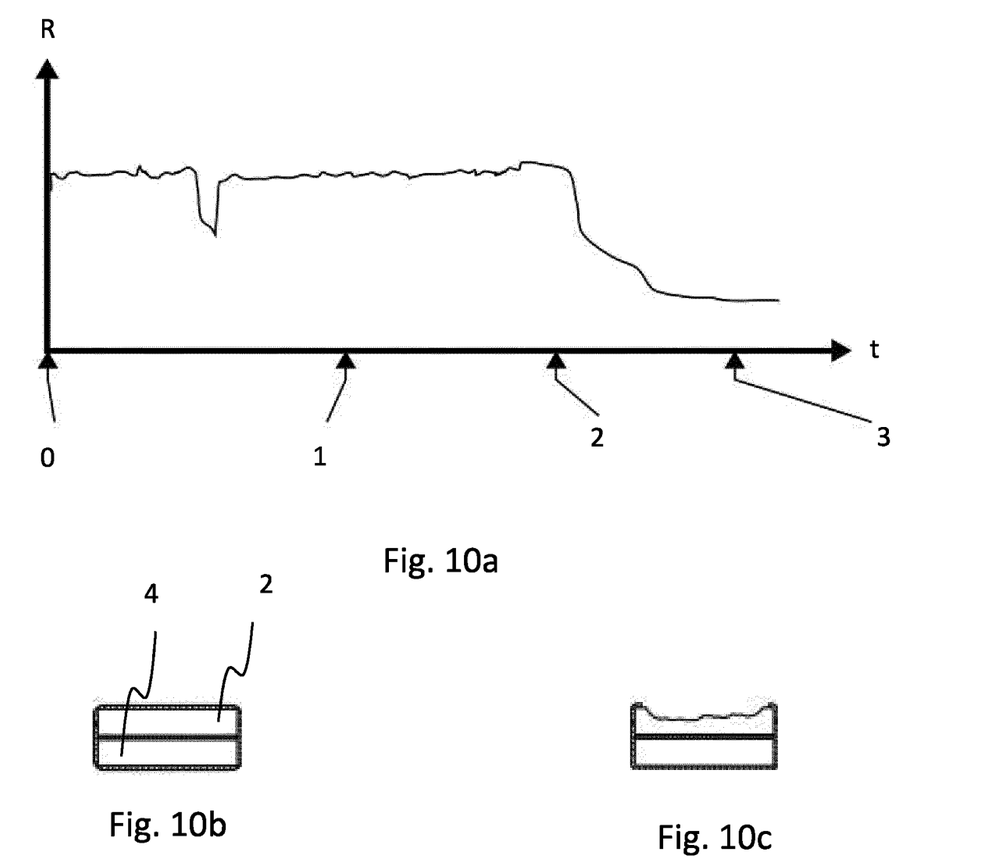
FIG. 10a is a measurement of resistance as a function of time.
FIGS. 10b-10e illustrates corrosion of part of a probe as a function of time.
Figure 10D:
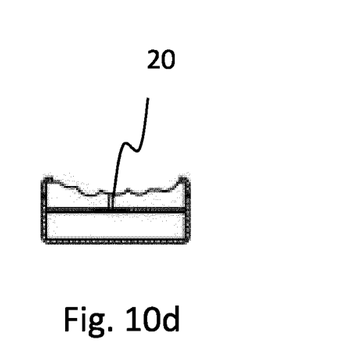
Figure 10E:
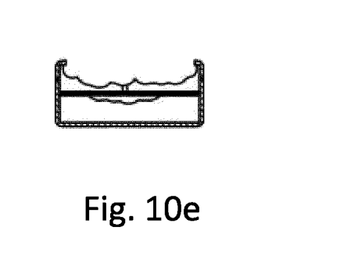

FIG. 10a is a measurement of the impedance R between the ground electrode shown in FIG. 9 and the second element of the probe shown in FIG. 9 as a function of time t. Four different stages of corrosion of the first element is illustrated in FIGS. 10b-10e corresponding to the probe (first element and second element) seen at times 0, 1, 2, 3 in FIG. 10a.

As a new probe is placed proximate to the pipeline at time 0, no corrosion of the first element has taken place and the second element is not yet directly exposed to the corrosive environment. The impedance between the ground electrode and the second element is infinite, which in praxis means at least 2 MΩ. As time passes, the first element experiences a corrosion, which is illustrated by the thickness of the first element at time 1 is less than at time 0. At time 1, the impedance between the ground electrode and the second element is still infinite, because even though the first element is corroded, the corrosion has not penetrated the first element. At time 2, a local corrosion of the first element has created a pinhole in the first element so that the second element has become directly exposed to the environment. Current can therefore pass through the pinhole. The pinhole is approximately 1 mm wide. The impedance falls to a finite value of approximately 1 kΩ. The impedance is proportional to the size of the pinhole. The wider the pinhole, the lower is the impedance. Since the second element has become exposed to the environment at time 2, it starts to corrode, which is illustrated at time 3 by a part of the second element being corroded.

In the following is given a list of reference signs that are used in the detailed description of the invention and the drawings referred to in the detailed description of the invention.

1 Probe
2 First element
3 Sponge
3a Top layer of sponge
3b Bottom layer of sponge
4 Second element
5 Third element
6 Housing
7 Opening
8 Electrical insulator
9 First terminal
10 Second terminal
11 Back terminal
12 Third terminal
13 Fourth terminal
14 First surface
15 Second surface 16 Pipeline
17 Ground electrode
18 First analyzing unit
OPA1 First amplifier
OPA2 Second amplifier
OPA3 Third amplifier
R1 First resistor
R2 Second resistor
P1 First potentiometer
P2 Second potentiometer
19a First current generator
19b Second current generator
20 Pinhole

The invention claimed is:

1. A system for detecting a locally generated corrosion of a metal element when exposing said metal element to a corrosive environment, said system comprising said metal element, wherein said metal element includes a first element defining opposite first and second surfaces, said first surface defining an exposed outer surface to be exposed to a corrosive environment, said first element comprising a first pair of terminals, said system further comprising:
- a first pair of electrical connectors, wherein each connector of said first pair of electrical connectors is connected to a respective terminal of said first pair of terminals so as to allow an injection of an electric current into said first element;
- a sponge, said sponge constituting in a dry state an electrical insulator and constituting an electrical conductor when wetted in said corrosive environment, wherein said sponge is juxtaposed said second surface of said first element;
- a second element of an electrically conductive material, wherein said second element is opposite to said second surface of said first element and wherein said sponge is sandwiched between said first element and said second element;
  - an electrical insulator, said electrical insulator together with said first element encapsulating said second element and said sponge so as to prevent said second element and said sponge from being directly exposed to said corrosive environment;
  - a current generator operable for injecting a specific electric current into said first element via said first pair of electrical connectors;
- a voltmeter configured for measuring a voltage between the terminals of said first pair of terminals, and for monitoring a gradual increase in said voltage due to corrosion of said first element;
- a measuring unit configured for measuring an impedance between said second element and a ground electrode; and
- an analyzing unit configured for monitoring a decrease in said impedance from an infinite impedance to a finite impedance caused by a pinhole being generated in said first element, thereby causing said sponge to be wetted and an electric conducting path to be established between said second element and said ground electrode.

2. A probe for detecting a locally generated corrosion of a metal element when exposing said metal element to a corrosive environment, said probe comprising said metal element, wherein said metal element includes a first element defining opposite first and second surfaces, said first surface defining an exposed outer surface to be exposed to a corrosive environment, said first element comprising first and second terminals configured for connecting to first and second electrical connectors, respectively, said first and second electrical connectors being configured for connection to a current source operable to introduce a current through said first element between said first and second terminals;
wherein the probe further comprises:
- a sponge, said sponge constituting in a dry state an electrical insulator and constituting an electrical conductor when wetted in said corrosive environment, wherein said sponge is juxtaposed said second surface of said first element;
- a second element of an electrically conductive material, wherein said second element is opposite to said second surface of said first element and wherein said sponge is sandwiched between said first element and said second element; and
- an electrical insulator, said electrical insulator together with said first element encapsulating said second element and said sponge so as to prevent said second element and said sponge from being directly exposed to said corrosive environment.

* * * * *